Oct. 31, 1944.  C. E. E. LUNDQUIST  2,361,853
JOINT, MORE PARTICULARLY FOR CHAIRS,
BEDSTEADS, STRETCHERS, OR THE LIKE
Filed June 22, 1942   2 Sheets-Sheet 2
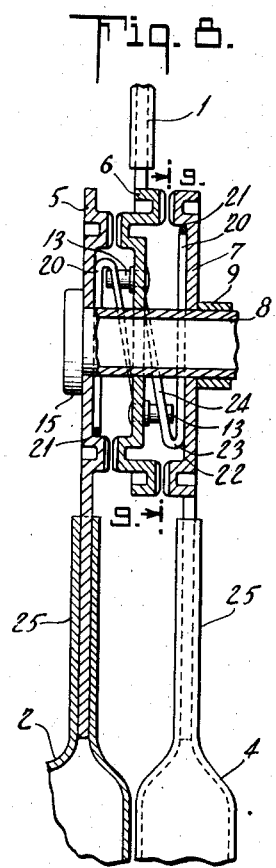
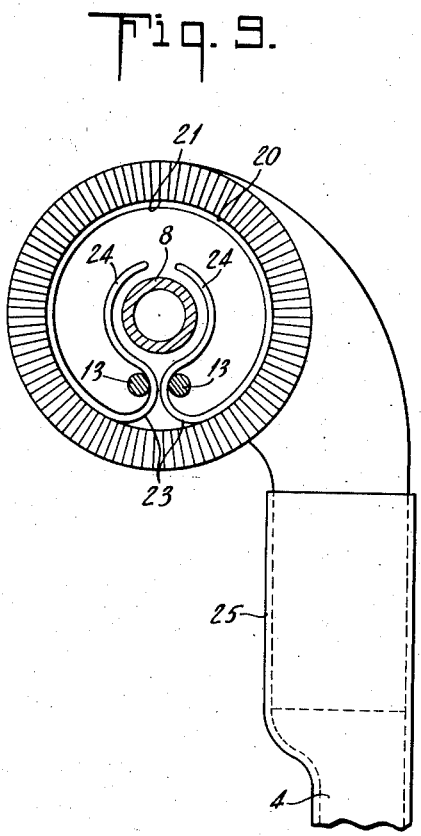
INVENTOR
Carl Ernst Edward Lundquist
BY
ATTORNEY Oct. 31, 1944.     C. E. E. LUNDQUIST     2,361,853
JOINT, MORE PARTICULARLY FOR CHAIRS,
BEDSTEADS, STRETCHERS, OR THE LIKE
Filed June 22, 1942     2 Sheets-Sheet 1
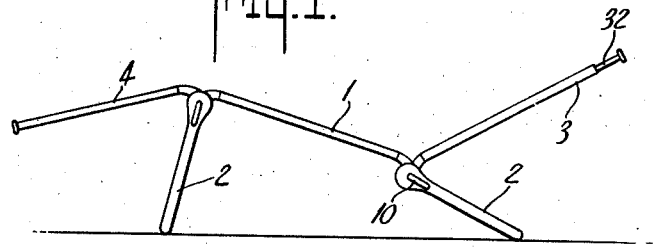
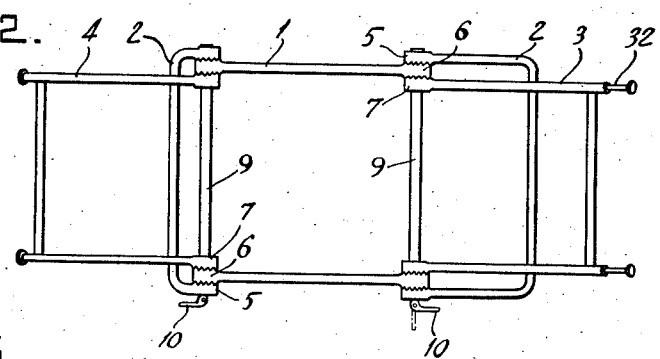
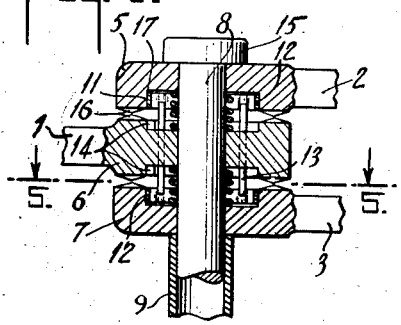
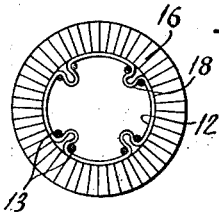
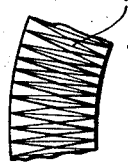
INVENTOR
Carl Ernst Edvard Lundquist
BY
ATTORNEY Patented Oct. 31, 1944

2,361,853

UNITED STATES PATENT OFFICE 2,361,853

JOINT, MORE PARTICULARLY FOR CHAIRS, BEDSTEADS, STRETCHERS, OR THE LIKE

Carl Ernst Edvard Lundquist, Stockholm, Sweden

Application June 22, 1942, Serial No. 447,968
In Sweden June 21, 1941

8 Claims. (Cl. 287—14)

My invention relates to joints, more particularly for chairs, bedsteads, stretchers or the like, in which members, such as the seat, back-rest, foot-rest and the legs, are relatively rotatable and adapted to be shifted and locked in different angular positions. It is known to provide such joints with two or more hub elements, which are axially movable relatively to the centre of rotation of the joint in a manner such as to be brought into and out of locking position by a force acting in the axial direction. It is the main object of the invention to improve joints of this type, so that the hub elements, even when they are not locked, will be kept in their position with a force which does not cause any annoying resistance to a desired adjustment, and which also does not obstruct or impair the locking effect in the axial direction.

Further objects and advantages of the invention will be apparent from the following description considered in connection with the accompanying drawings which form a part of this specification, and of which:

Fig. 1 shows a side view of a frame for an adjustable chair according to the invention.

Fig. 2 shows a plan view of the frame.

Fig. 3 shows a side view of the frame in collapsed condition.

Fig. 4 shows a section through one of the joints of the frame to an enlarged scale.

Fig. 5 shows a portion of this joint, partly in section on the line V—V of Fig. 4.

Fig. 6 is a section through two toothed rims on a still more enlarged scale.

Fig. 7 shows a portion of one of the toothed rims viewed from above.

Fig. 8 shows a section through the axis of a joint according to a modified embodiment of the invention.

Fig. 9 is a view taken on the line IX—IX of Fig. 8.

In the embodiment according to Figs. 1–7, 1 designates two frame members forming the seat of a chair, 2 are frames forming the legs, 3 is a back-rest frame and 4 a foot-rest frame. The frames may be made from steel pipes. The frames 2, 3 and 4 may be U-shaped. The frames 3 and 4 may be telescoped, as at 32, to form handles so that the chair also can be used as bedstead or stretcher.

The frames 1, 2 and 3 and 1, 2 and 4, respectively, are pivotally mounted relatively to each other about two shafts 8 (Fig. 4) with the aid of hub elements 6, 5 and 7 secured to the end portions of the frames. The hub elements 6 of the frame members 1 are arranged between the hub elements 5, 7, and the hub elements 7 of the frames 3 and 4 may be located inside the hub elements 6. In the embodiment shown, the distance between the hub elements 7 is fixed in an inward direction by means of a spacing piece, for instance in the form of a sleeve 9 surrounding the shaft 8.

An operating member 10, preferably in the form of a cam disk or the like provided with a handle, is mounted at the one end of the shaft 8. When the operating member 10 has been rotated into the position shown by full lines in Fig. 2, the hub elements 5, 6, 7 are pressed in the axial direction against each other so as to be locked in the desired position. The shaft 8 may be formed at the opposite end thereof with an enlarged head 15 (Fig. 4) bearing against the outermost hub element 5. The locking in the axial direction therefore takes place in the two groups of hub elements 5, 6, 7 at the same time through the intermediary of the spacing sleeve 9. Various arrangements are conceivable to ensure effective locking against mutual rotation between the frame members. In the embodiment shown, the hub elements are provided with toothed rims 16 which, when the operating member is moved into the locking position, are caused to engage one another to ensure effective locking in the turning direction.

If the operating member 10 is rotated upwardly into the position indicated with dotted lines in Fig. 2 the hub elements are caused to slide apart, preferably through the agency of helical springs 11 (Fig. 4) arranged therebetween, whereupon the various frame members of the chair may be shifted into other positions with respect to each other. In order then to prevent the chair or parts thereof from collapsing in unloading condition, the hub elements are provided, according to the invention, with brake members, which in the embodiment according to Figs. 1–7 have the form of an annular spring 12. This spring is inserted into a circular recess 17 in one of the hub elements and bears on the outer, preferably cylindrical peripheral portion of this recess with a predetermined initial tension acting in a radial direction. In order to produce this radial pressure, the annular spring 12 may be provided with radial folds 18 (Fig. 5). Projecting members 13 secured to the other one of the hub elements, preferably the middle one 6, are disposed immediately adjacent the both sides of the folds 18 at the base thereof (see Fig. 5). The cooperating hub elements 6 and 5, 7, respectively, consequently cannot be rotated unless a torque overcoming the radial friction of the annular spring 12 on the hub elements be applied to the various frame members. This braking moment may be simply and conveniently determined by means of the device shown, in a manner such that the frame members will not be rotated relatively to each other by small forces, as for instance by their own weight, whereas the braking moment is readily overcome, when changing the angular position of the frame members. According to the invention, the annular spring 12 at the same time does not offer any appreciable resistance to the axial locking of the hub elements of the frames to each other, as described above. Consequently, when the hub elements are moved axially toward one another, the projecting members 13 slide freely relatively to the folds 18 of the annular spring. To prevent the spring 12 from being displaced out of its proper position, two or more shoulders 14 may be provided in the central hub element 6, adjacent the spring and distributed around the periphery thereof.

As appears from the aforesaid a shifting movement of the legs 2 cannot exert any influence on the foot-rest 4, or vice versa, inasmuch as the hub elements of these members are located on opposite sides of the hub element 6 of the seat frame 1 of the chair.

The cooperating toothed rims 16 of the hub elements may be formed with a tooth section according to Figs. 6 and 7, that is to say, the tooth section is triangular, the teeth having their apexes somewhat bevelled off in both directions from the centre obliquely down toward the base portion. This assures that the teeth will slide into each other with certainty, even if for some reason or other two hub elements should become disposed somewhat eccentrically with respect to each other.

If the back-rest and the foot-rest are adjusted so as to lie in the same plane as the seat, the chair may serve as a bedstead. If the legs are swung upwards, a stretcher is obtained.

In the embodiment according to Figs. 8 and 9, the brake member 20 is adapted additionally to have the function of the spring member 11 in the foregoing embodiment. To this end the member 20 is provided with a circular portion 21 engaging a recess 22 in one of each pair of cooperating hub members 5, 6, 7 with a predetermined initial radial tension. The brake member 20, which may be formed as a thread with circular cross section, is at both ends of the circular portion 21 bent axially outwardly and radially inwardly as at 23. The free end portions 24 of the member 20 are then bent backwardly and extend obliquely to the other hub element. The circular portion 21 may be placed in the two outermost hub elements 5, 7 from which the portions 23, 24 extend to the central hub element 6. Projecting members 13 extend from the last mentioned hub element axially on both sides of the central portions 23 of the brake member 20. The portions 24 of the brake member may be bevelled over part of its length (see Fig. 8).

As in the previous embodiment the annular portion 21 of the brake member sets up a braking torque resisting any undesired rotation of the frame members 1, 2, 3, 4 when their hub elements are out of locking position. The portions 23, 24 of the brake member on the other hand are adapted to exercise a pressure in axial direction which is just sufficient to move the hub elements 5, 6, 7 out of engagement when the joint is brought out of locking position.

The hub elements are in the embodiment according to Figs. 8 and 9 made from metal sheets which are pressed to the desired contour. The ends of the respective frame members 1, 2, 3, 4 which latter are made from metal pipes are preferably flattened out, as at 25, to form narrow recesses adapted to receive the ends of the sheet metal hubs. The frames are then secured to the hub elements as by riveting or spot welding.

Although not limited thereto the invention is particularly adapted for easy-chairs, stretchers, bedsteads or the like for hospitals, resting-homes, shelter-rooms, and for military medical attendance as well as for private service, where the demands for easy transportability and manageability are great.

While more or less specific embodiments of the invention have been shown, it is to be understood that the same are for purpose of illustration only, and that the invention is not to be limited thereby, but its scope is to be determined by the appended claims viewed in the light of the prior art.

What I claim is:

1. In a rotatable joint, a plurality of elements rotatable with respect to each other about an axis of rotation, said elements having adjacent radial faces formed with axially extending interengaging projections, means for exerting an axial force on said elements for clamping said faces together with said projections interengaged, and friction braking means for resisting relative rotation of said elements when said projections are disengaged.

2. In a rotatable joint, a plurality of elements rotatable with respect to each other about an axis of rotation, said elements having adjacent radial faces formed with axially extending interengaging projections, spring means between said elements for forcing said faces apart axially to thereby disengage said projections, means for exerting an axial force on said elements against the force exerted by said spring means for clamping said faces together with said projections interengaged, and friction braking means for resisting relative rotation of said elements when said projections are disengaged.

3. In a rotatable joint, a plurality of elements rotatable with respect to each other about an axis of rotation, said elements having adjacent radial faces formed with axially extending interengaging projections, means for exerting an axial force on said elements for clamping said faces together with said projections interengaged, one of said elements having an interior cylindrical surface, a generally circular spring in frictional engagement with said cylindrical surface, and means for anchoring said spring to the adjacent element.

4. In a rotatable joint, a plurality of elements rotatable with respect to each other about an axis of rotation, said elements having adjacent radial faces formed with axially extending interengaging projections, means for exerting an axial force on said elements for clamping said faces together with said projections interengaged, one of said elements having an interior cylindrical surface, a generally circular spring in frictional engagement with said cylindrical surface, and means for preventing relative rotation between said spring and the adjacent element, said spring being movable axially with respect to the last-mentioned means, the axial extent of said last-mentioned means being greater than that of said spring by an amount at least as great as the relative axial displacement of said elements between engaged and disengaged positions of said projections.

5. In a rotatable joint, a plurality of elements rotatable with respect to each other about an axis of rotation, said elements having adjacent radial faces formed with axially extending interengaging projections, means for exerting an axial force on said elements for clamping said faces together with said projections interengaged, one of said elements having an interior cylindrical surface, a generally circular spring in frictional engagement with said cylindrical surface, said spring being formed with folds extending inwardly in generally radial directions, and projections extending from the adjacent element and engaging said folds to anchor said spring against rotation with respect to said adjacent element.

6. In a rotatable joint, a plurality of elements rotatable with respect to each other about an axis of rotation, said elements having adjacent radial faces, triangular teeth extending radially along and axially from said faces, the adjacent edges of the apexes of said teeth being beveled, means for exerting an axial force on said elements for clamping said faces together with said teeth interengaging, and friction braking means for resisting relative rotation of said elements when said teeth are disengaged.

7. In a rotatable joint, a plurality of elements rotatable with respect to each other about an axis of rotation, said elements having adjacent radial faces formed with axially extending interengaging projections, one of said elements having an interior cylindrical surface, a spring having a generally circular portion expanding into frictional contact with said cylindrical surface and having an axially extending portion anchored to and expanding against the adjacent element for urging said radial faces apart axially to thereby disengage said projections, and means for exerting an axial force on said elements against the force exerted by the axially extending portion of said spring for clamping said faces together with said projections interengaged.

8. In a folding chair, a seat member, a leg member and a rest member, elements secured to each of said members and rotatable with respect to each other about an axis of rotation, the element which is secured to said seat member being between the other two elements, said elements having adjacent radial faces formed with axially extending interengaging projections, means for exerting an axial force on said elements for clamping said faces together with said projections interengaged, and friction braking means anchored against rotation to the central element and frictionally engaging the other elements for resisting relative rotation of said elements when said projections are disengaged.

CARL ERNST EDVARD LUNDQUIST.